G. H. DAY & O. B. CARSON.
OPHTHALMIC MOUNTING.
APPLICATION FILED AUG. 11, 1916.
1,241,717. Patented Oct. 2, 1917.
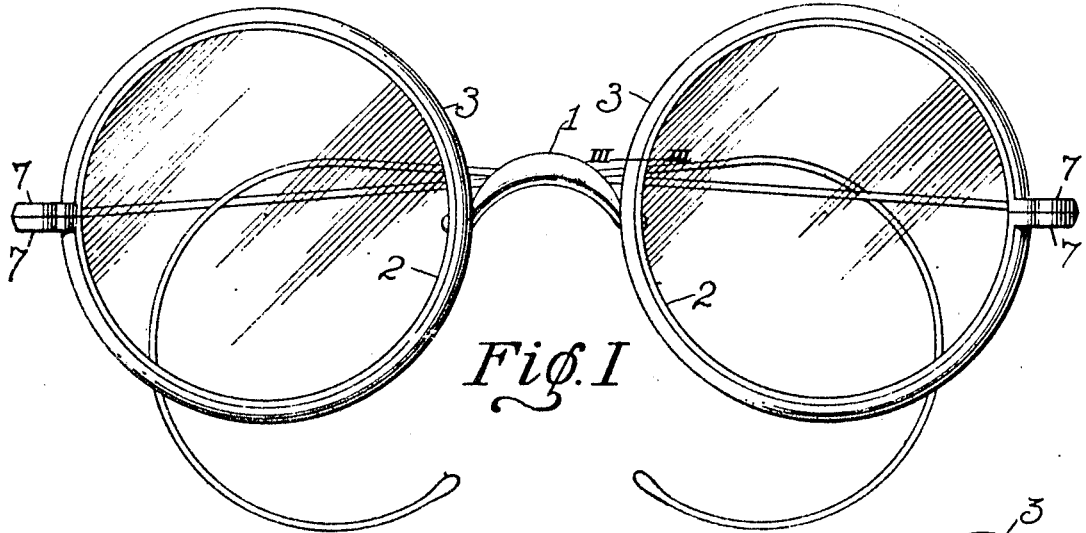
Fig. I
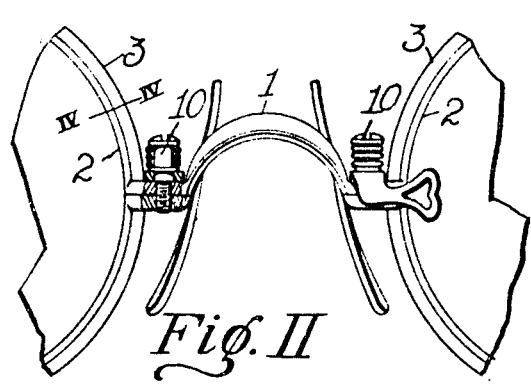
Fig. II
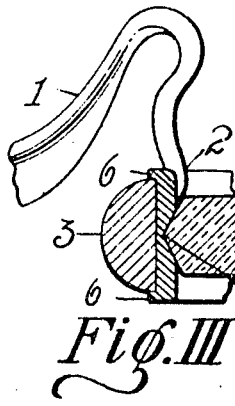
Fig. III
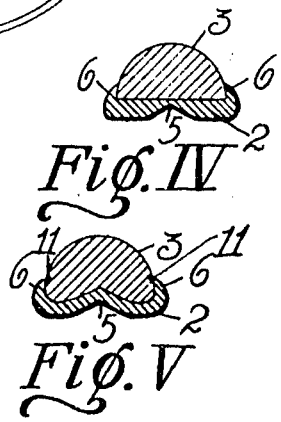
Fig. IV
Fig. V
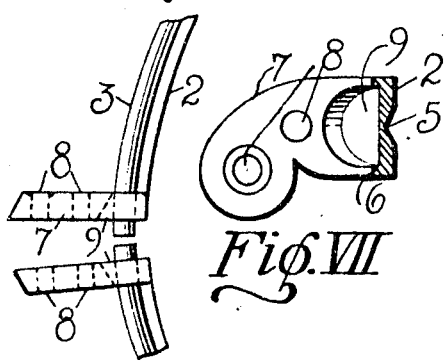
Fig. VI
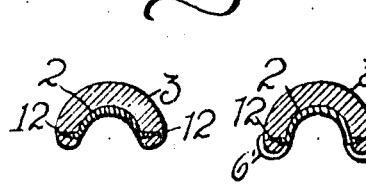
Fig. VII  Fig. VIII  Fig. IX
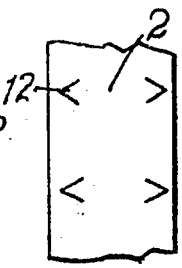
Fig. X
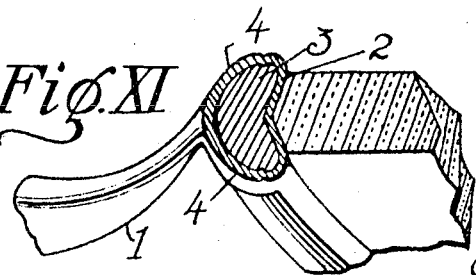
Fig. XI
WITNESSES:
Joseph J. Demers
Edith M. Halvorsen
INVENTORS
OSWALD B. CARSON AND
GEORGE H. DAY
BY
H. H. Styll & H. K. Parsons
ATTORNEYS

UNITED STATES PATENT OFFICE.

GEORGE H. DAY AND OSWALD B. CARSON, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,241,717.  Specification of Letters Patent.  Patented Oct. 2, 1917.

Application filed August 11, 1916. Serial No. 114,383.

*To all whom it may concern:*

Be it known that we, GEORGE H. DAY and OSWALD B. CARSON, citizens of the United States, residing at Southbridge, in the county of Worcester and State of Massachusetts, have invented certain new and useful Improvements in Ophthalmic Mountings, of which the following is a specification.

Our invention relates to improvements in ophthalmic mountings and has particular reference to an improved construction of mounting which shall combine the ornamental and useful features of both metallic or shell and composition frames in a neat and attractive manner.

One of the leading objects of the present invention is the provision of an improved frame for an ophthalmic mounting which shall embody the strength and durability of an ordinary metallic construction together with the ornamental appearance and the cushioning or lens protecting features of a non metallic frame.

A further object of the present invention is the provision of a frame of this character in which the usual appearance of a heavy composition or shell frame shall be relieved and ornamented by an attractive metallic portion.

Other objects of the present invention include facilitating the durable and permanent connection of the bridging member and end pieces or the like of a metallic character with eye wires or frames of non-metallic material, the splitting of the frame or eye wire portions of a non-metallic frame and the adjustable connection of the split ends to facilitate ready insertion and removal of lenses from the frames as desired without the necessity of heating or otherwise softening the non-metallic frame to snap the lenses in position with the attendant possibility of breakage of either the frame or lens, and in general the provision of a frame of simple construction and attractive appearance.

Other objects and advantages of our improved construction should be readily apparent by reference to the following description taken in connection with the accompanying drawings, and it will be understood that we may make any modifications in the specific details of construction shown and described within the scope of the appended claims without departing from or exceeding the spirit of our invention.

Figure I represents a front view of a frame constructed in accordance with and embodying the generic principles of our invention.

Fig. II represents a front view of a different type of construction.

Fig. III represents a sectional view as on the line III—III of Fig. I, illustrating the attachment of the bridge and associated parts.

Fig. IV represents a sectional view through the frame proper as on the line IV—IV of Fig. II.

Fig. V represents a similar view of a slightly modified construction.

Fig. VI represents an enlarged detail view of the end piece construction, parts being shown in dotted line.

Fig. VII represents an end view of the parts shown in Fig. VI.

Fig. VIII represents a sectional view of another modified construction of rim.

Fig. IX represents a similar view showing the frame member overlapping the exterior of the non-metallic member.

Fig. X represents a plan view of the blank from which the construction illustrated in Figs. IX may be formed.

Fig. XI represents a view of a modified form of attachment of a spectacle bridge to the eye wires or frames.

In the drawings, in which similar characters of reference are employed to denote corresponding parts throughout the several views, the numeral 1 designates the usual metallic bridge member, which in Fig. I is shown as having its end secured directly to the metallic eye wire designated as an entirety by the numeral 2 and having fitting therearound at its point of attachment and extending around the metallic eye wire the non-metallic rim portion 3.

In Fig. XI, we have illustrated a slight modification of the construction in which in place of the end of the bridge fitting beneath the composition or non-metallic member 3 it is provided with the pair of ears 4 which span the portion 3 and are secured to the frame, thus steadying the portion 3 in position.

It is to be understood that throughout the specification the term "composition" is meant to include both shell, zylonite, rubber and other like materials suitable for this purpose, or generally speaking, materials of other than a metallic nature, and which from their character possess a certain degree of resiliency but which on account of their relative lack of strength are ordinarily preferably made in thick or heavy form. It has been found that these are desirable on account of the fact that they are very light in weight and at the same time have a considerable cushioning effect so that upon dropping a pair of spectacles or eyeglasses incased in rims of this nature the lenses are much less liable to be shattered than if ordinary rims were employed. Hitherto, however, it has usually been customary to simply snap the lenses into position within these frames forming them in the shape of a closed rim in place of having them split as is the case with ordinary frames, and this has involved some difficulties in the mounting of the lenses by persons not experienced in the work, this being one of the objections overcome by the present invention.

In that form of the invention illustrated in Figs. I, III, IV, VI and VII, we have shown the metallic rim member 2 as formed from heavy metallic material and preferably centrally indented in the lens receiving groove 5 and provided at its edges with the bead or flange portions 6 forming rims within which fit the non-metallic or composition rim member 3, this rim member being formed as shown in Fig. III with a recess at its rear face to receive the end of the bridge where attached to the frame member, but otherwise fitting entirely within the rims 6 with the said rims extending partly over the face thereof so that the metallic (preferably gold or gold-filled) rim member 2 and flange 6 will display an inner gold portion inclosed by the outer attractive and cushioning non-metallic or composition portion 3.

In this form of the invention we employ the end pieces 7 secured to the ends of the metallic frame to unite the ends and thus detachably secure a lens in position in the usual manner. These end pieces are provided with the screw or dowel apertures 8 in the customary manner, but are in addition formed adjacent their point of attachment to the rim 2 with the enlarged flared aperture 9, as is clearly illustrated in Figs. VI and VII. In use, the frame having been constructed, the portion 3 is passed around the metallic portion 2 and fitted down between the beads or side flanges 6 with its ends passed through the flared apertures 9 and preferably projecting slightly therefrom. The parts are then securely held in this position, the projecting end portions being softened by heating or any other suitable manner and pressed down to fill in the flared apertures 9 forming enlargements or heads at each end of the portion 3 securely engaged in the end pieces 7 to lock the several parts together. This locking action may be supplemented if desired by forming the bridge with the ears 4 as particularly illustrated in Fig. XI whereby a central aperture is provided between the ears through which passes the portion 3 of our mounting, the ears thus embracing and securely retaining the composition member at the inner side of the frame.

A similar construction to that just described is illustrated in Fig. II of the drawings, with the exception that in this instance we have illustrated a fingerpiece or like type of mounting in place of a spectacle, the joint here being disposed adjacent the bridge so that the single pivot or locking screw 10 may be employed to hold the two end piece parts together to lock the lens in place and the bridge being integral with one of the end piece sections.

In the event that it is desired to insure an extremely secure joint or connection between the metallic or non-metallic portions of our mounting, we may if desired extend the flanges 6 in the inturned portions 11 which may be pressed to bite into the material 3, in this event the parts being preferably originally produced in strip form, then cut and shaped to desired lengths.

Fig. VIII illustrates a further slight modification of our invention in which the metallic frame 2 has the lateral extending prongs 12 while the portion 3 is shaped in semi-tubular form to fit around the frame 2 and is pressed down onto the prong portions 12 to securely interlock therewith.

Figs. IX and X illustrate a further development of this construction, in which the frame portion is in the form of a wide strip of material which may be first concave if desired to provide the lens receiving groove with the laterally projecting prongs 12, the semi-tubular portion 3 being then pressed in position around the concave member and fitted down upon the prongs 12, when the remaining edge portions or flanges 6' are curled up around the edges of the semi-tubular member 3 embracing these edges to present the neat and ornamental appearance of the combined metallic and non-metallic structure, and at the same time serving to securely lock the edges in engagement with the prongs to prevent any accidental separation of the parts.

We claim:

1. The combination with a metallic lens receiving frame having end piece members extending outwardly therefrom, of a non-metallic frame member surrounding the metallic frame member and having its ends secured to the outwardly extending end pieces whereby the parts are firmly held together in a unitary structure when the frame is opened for insertion or removal of a lens.

2. As an improved frame for an ophthalmic mounting, the combination with a metallic framing member having a lens receiving groove and having reversely outwardly extending side portions, of a non-metallic member fitted around the lens receiving portion or groove of the metallic member and partially embraced by the metallic member whereby the metallic member serves to retain the non-metallic member in position thereon.

3. The combination with a metallic lens receiving frame, said frame being split at one side and having connecting plates or end pieces secured to its termini, of a non-metallic rim surrounding the metallic rim and having a split therein corresponding with that of the metallic frame, the connecting plates having apertures formed therein, and headed members engaged in the apertures for locking the ends of the non-metallic frame to said connecting plates.

4. In an ophthalmic mounting, the combination with a metallic lens receiving frame, of a non-metallic ornamental frame extending therearound and means for positively uniting the frame members one to the other.

5. A frame member for an ophthalmic mounting, comprising a metallic strip having a central groove or V-shaped form terminating in reversely laterally outwardly and inwardly gripping portions adapted to clampingly engage and retain in position an ornamental supplemental frame member.

6. A frame for an ophthalmic mounting, including a metallic portion for embracing the lens having outwardly deflected lateral flanges, end piece members carried by the ends of the metallic member and having apertures formed therethrough, and a non-metallic rim member encircling the metallic member and fitting between the lateral deflected flanges thereof, said composition member having its ends passing through and secured within the apertures in the end piece members to securely connect the metallic and composition members, substantially as described.

7. In an ophthalmic mounting, the combination with a metallic lens embracing member, of a non-metallic rim disposed exterior to the metallic member, and bands encircling the non-metallic member and engaging the metallic member to securely connect the parts.

8. In a device of the character described, the combination with a metallic rim and an encircling non-metallic portion, one of said members having apertured portions and the other having extensions fitting within said apertures and means for locking the extensions within the apertures.

9. In an ophthalmic mounting, the combination with a metallic lens engaging rim, of an end piece member carried by each end of the rim, said members having alined apertures to receive a fastening screw for drawing the parts in tight engagement one with the other, and having additional apertures formed therethrough immediately adjacent their points of attachment to the metallic frame, non-metallic frames surround the metallic frames and engaging the end pieces to conceal the apertures therein, and means in the apertures for securing the ends of the non-metallic frame to the end pieces to positively join the several parts in a unitary structure.

10. An eye for an ophthalmic mounting, comprising a continuous indented metallic strip, abutments at the termini of said strip, means for securing the abutments together, a continuous non-metallic strip superimposed on the metallic strip and terminating at the abutments thereof, and means for securing the non-metallic strip in position on the metallic strip.

11. In an ophthalmic mounting, a pair of continuous metallic eye wires, abutments at the ends of said eye wires, means for securing the abutments together, a pair of non-metallic eye wires encircling the metallic eye wires and terminating at the abutments thereof, means for holding the non-metallic eye wires in place on the metallic eye wires, and a bridge uniting the two metallic eye wires.

In testimony whereof we affix our signatures in the presence of two witnesses.

GEORGE H. DAY.
OSWALD B. CARSON.

Witnesses:
EDITH M. HALVORSEN,
HAROLD K. PARSONS.